3,583,894
ENZYME PREPARATION OF HESPERETIN DIHYDROCHALCONE GLUCOSIDE
Robert M. Horowitz, Pasadena, and Bruno Gentili, Glendale, Calif., assignors to the United States of America as represented by the Secretary of Agriculture
No Drawing. Filed Mar. 29, 1968, Ser. No. 717,371
Int. Cl. C12b 1/00
U.S. Cl. 195—31    3 Claims

ABSTRACT OF THE DISCLOSURE

Process for preparing hesperetin dihydrochalcone glucoside from hesperidin by treating hesperidin with alkali, hydrogenating and hydrolyzing with naringinase free of glucosidase to remove rhamnose.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel processes for preparing hesperetin dihydrochalcone glucoside. Further objects of the invention will be evident from the following description wherein parts and percentages are by weight unless otherwise specified.

In our Pat. 3,087,821, issued Apr. 30, 1963, we have shown that certain dihydrochalcones exhibit intense sweetness and are useful for sweetening foods of all kinds. Among the compounds which exhibit this unusual property of intense sweetness is hesperetin dihydrochalcone glucoside.

We have now found that this compound can be prepared from hesperidin. Hesperidin is a flavanone glycoside which occurs naturally in oranges and lemons and is a by-product of the commercial processing of such fruit. It is abundantly available, relatively low in price, and to date has had few or no commercial uses. Thus, the present invention is not only valuable as a means of making available a useful sweetening agent but also as a means of utilizing a by-product of the orange and lemon processing industry.

In a practice of the process of the invention, the following steps are applied:

(A) The starting compound, hesperidin, which is tasteless, is converted into hesperidin chalcone. This step is carried out in conventional manner as by contacting the starting compound with a solution of an alkali, for example, a 10–25% aqueous solution of NaOH or KOH at room temperature.

(B) The hesperidin chalcone is then converted into the corresponding dihydrochalcone, by conventional hydrogenation. Thus, for example, the chalcone is contacted with hydrogen gas in the presence of a hydrogenation catalyst such as finely divided platinum, palladium, or Raney nickel. It may be observed that hesperidin dihydrochalcone is essentially tasteless.

(C) The hesperidin dihydrochalcone is then converted into hesperetin dihydrochalcone glucoside by enzymatic hydrolysis. In this hydrolysis the sugar moiety of the hesperidin dihydrochalcone is attacked, resulting in splitting off the rhamnose portion thereof. The remainder of the molecule remains the same. In sum, the original β-rutinosyl radical (which may also be termed the 6-O-α-L-rhamnosyl-β-D-glucosyl radical) is converted into a β-D-glucosyl radical. The hesperetin dihydrochalcone glucoside can be more precisely named 3,2′,6′-trihydroxy-4-methoxy-4′-β-D-glucosyloxydihydrochalcone.

The chemical changes invloved in the synthesis are demonstrated by the following formulas:

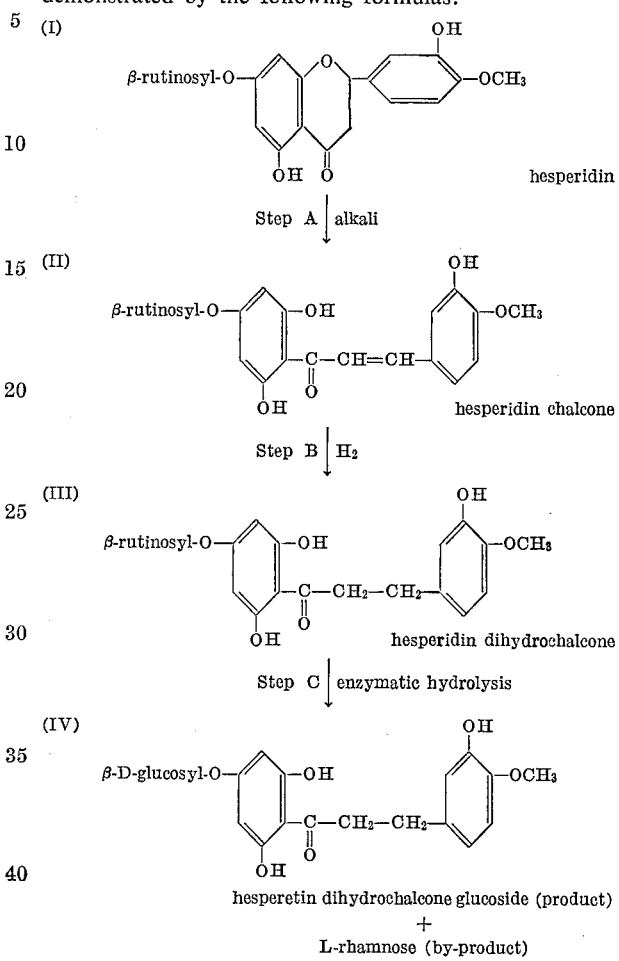

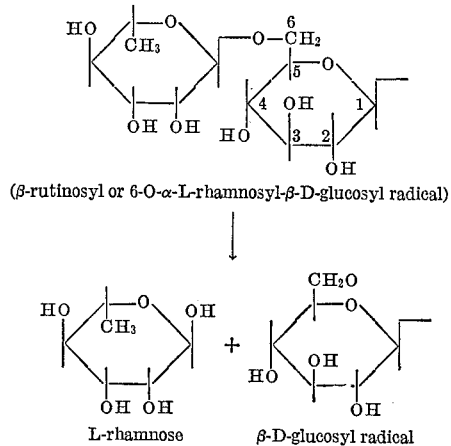

(β-rutinosyl or 6-O-α-L-rhamnosyl-β-D-glucosyl radical)

L-rhamnose    β-D-glucosyl radical

In carrying out Step C, a special enzyme is employed in order to favor conversion of the rutinosyl radical into a glucosyl radical and to minimize complete hydrolysis of the rutinosyl moiety. Such complete hydrolysis would yield the compound hesperetin dihydrochalcone which is only slightly sweet and is additionally very insoluble in water. (The structure of hesperetin dihydrochalcone may be visualized by considering Formula III above, wherein the β-rutinosyl radical is replaced by H).

The special enzyme used in Step C is readily prepared from naringinase, an enzyme elaborated by the fungus *Aspergillus niger*, and which is commercially available. Naringinase contains both glucosidase and rhamnosidase components; hence, if it were used as is it would cause the undesired complete hydrolysis mentioned above. However, by a simple treatment, the glucosidase component can be inactivated without substantial loss of rhamnosidase activity. This is accomplished by heating an aqueous dispersion of naringinase (maintained at a pH of 6.4 to 6.8) to a temperature of about 60–65° C. and holding it at that temperature until the glucosidase component is inactivated—this will usually be about 30 minutes to 2 hours, depending on such factors as the origin of the enzyme, and the particular pH and temperature selected. It is obvious that known tests for glucosidase and rhamnosidase activity may be employed to select reaction conditions which provide maximum destruction of glucosidase activity coupled with least destruction of rhamnosidase activity.

In a typical application of Step C, the glucosidase-free naringinase is added to an aqueous solution of hesperidin dihydrochalcone. If the pH of the mixture is not at about neutrality (6.5 to 7) it is brought to this level by addition of a conventional buffer. The reaction mixture is then held at a temperature of about 25 to 50° C. until the desired reaction is essentially complete. After completion of the hydrolysis step, the product, hesperetin dihydrochalcone glucoside, can be readily separated from any completely hydrolyzed by-product (hesperetin dihydrochalcone) by applying conventional separation techniques capable of taking advantage of the fact that the product is soluble in water while the by-product is very insoluble in water. One can alternatively use other separation techniques such as extraction with different organic solvents to selectively extract the respective compounds from the reaction mixture.

Beyond the chemical changes which occur in the aforesaid hydrolysis step: the *tasteless* compound, hesperidin dihydrochalcone, is converted into the *intesely sweet* compound, hespertin dihydrochalcone glucoside. This compound exhibits a sweetness about equal to that of saccharin, on a molar basis. Moreover, hesperetin dihydrochalcone glucoside imparts a more agreeable sweetness (i.e., less clinging and absence of bitter or other secondary taste effects) than some of the other dihydrochalcone sweeteners such as naringin dihydrochalcone or prunin dihydrochalcone.

The invention is further demonstrated by the following illustrative example.

EXAMPLE (A) Fifty grams of hesperidin was dissolved in 250 ml. of 10% aqueous potassium hydroxide. This solution, which contains hesperidin chalcone after brief standing, was used directly in the next step.

(B) Five grams of a hydrogenation catalyst (10% palladium-carbon) was added and the solution hydrogenated at about 30 p.s.i. at room temperature until the hydrogenation was complete (90 minutes). The product was filtered and brought to pH 6.7 by the addition of hydrochloric acid. An aliquot of this solution representing 6 grams of hesperidin was diluted to 245 ml. with water and used in Step C.

(C) One hundred eighty (180) ml. of the enzyme solution (prepared as described below) was added to the solution of hesperidin dihydrochalcone and the system held at 45° C. for 13 hours. (After 3 hours the mixture was seeded with hesperetin dihydrochalcone glucoside). The product was refrigerated overnight, then filtered through Celite (a diatomaceous earth filter aid). The filter cake was extracted with boiling methanol, the methanol extract decolorized with charcoal, filtered and taken to dryness. The residue crystallized from ethanol, giving 1.68 grams of chromatographically pure hesperetin dihydrochalcone glucoside, M.P. 122°. An additional quantity was obtained from the aqueous filtrate by extracting first with ether (to remove traces of hesperetin dihydrochalcone) and then with ethyl acetate to extract the desired product. The combined yield of crystalline hesperetin dihydrochalcone glucoside was 2.15 grams (47% based on hesperidin).

Preparation of the special enzyme: Ten grams of naringinase A (Rohm and Haas Company) was added with shaking to a solution made up of 18.2 ml. of 0.1 M potassium dihydrogen phosphate and 182 ml. of 0.2 M disodium hydrogen phosphate. The mixture, after filtering through Celite, gave a clear solution having pH 6.6. This was kept at 65° for 2 hours to inactivate the β-glucosidase present. The resulting solution was used as described in part C.

Having thus described the invention, what is claimed is:

1. A process for preparing hesperetin dihydrochalcone glucoside which comprises:
   (A) contacting hesperidin with alkali to produce hesperidin chalcone,
   (B) hydrogenating the hesperidin chalcone to produce hesperidin dihydrochalcone, and
   (C) contacting the hesperidin dihydrochalcone with an enzyme preparation which is capable of splitting off rhamnose from the rutinosyl radical of said dihydrochalcone but which is essentially free from glucosidase activity, whereby to produce hesperetin dihydrochalcone glucoside.

2. A process for preparing hesperetin dihydrochalcone glucoside which comprises subjecting an aqueous dispersion of hesperidin dihydrochalcone to the action of an enzyme preparation which is capable of splitting off rhamnose from said dihydrochalcone but which is essentially free from glucosidase activity.

3. The process of claim 2 wherein the enzyme preparation is naringinase, the glucosidase component of which has been essentially inactivated.

References Cited

UNITED STATES PATENTS 3,087,821   4/1963   Horowitz et al. ------ 99—141

OTHER REFERENCES

Kamiya et al., Agr. Biol. Chem., vol. 31, No. 2, p. 133-6, 1967.

Dunlap et al., Chemical Abstracts, vol. 60, No. 8281e, 1964.

Okada et al., Chemical Abstracts, vol. 62, No. 12081d, 1965.

A. LOUIS MONACELL, Primary Examiner

G. M. NATH, Assistant Examiner

U.S. Cl. X.R.

99—141